United States Patent [19]

Dieterich

[11] 4,275,416

[45] Jun. 23, 1981

[54] PCM DETECTOR

[75] Inventor: Charles B. Dieterich, Plainsboro, N.J.

[73] Assignee: RCA Corp., New York, N.Y.

[21] Appl. No.: 125,641

[22] Filed: Feb. 28, 1980

[51] Int. Cl.³ .................... H04N 9/493; H04N 7/08
[52] U.S. Cl. ................................. 358/147; 360/29; 360/32
[58] Field of Search ................... 358/4, 8, 13, 147; 360/29, 30, 32, 33

[56] References Cited

FOREIGN PATENT DOCUMENTS 2818704  4/1978  Fed. Rep. of Germany ........... 358/147

OTHER PUBLICATIONS

Stiltz "Aerospace Telemetry" 1961 pp. 190-191.

Primary Examiner—Robert L. Richardson
Attorney, Agent, or Firm—Eugene M. Whitacre; Joseph S. Tripoli; Richard G. Coalter

[57] ABSTRACT

A current source supplies current to an integrator representative of a difference between the instantaneous and average values of a video signal having a PCM data component time division multiplexed with an analog luminance component. The integrator is enabled during the central portion of each PCM signaling interval and reset to a reference level during initial and terminal portions of the intervals. Asymmetry of the peak-to-peak PCM signal levels with respect to the average signal level tends to result in asymmetrical excursions of the integrator output voltage relative to the reference level. This asymmetry is corrected by means of a charge source that supplied a predetermined quantity of charge continuously or in discrete packets to the integrator during the central portion of each PCM signaling interval. The integrator voltage excursions are thereby equalized and a substantially uniform probability of detection of the PCM data levels may be realized by means of a threshold device having a threshold level substantially equal to the reference level.

6 Claims, 4 Drawing Figures

PCM DETECTOR

This invention relates to detectors and particularly to pulse code modulation (PCM) detectors for recovering synchronous PCM data from a communications channel in which the PMC data is time division multiplexed (TDM) with analog data. A representative application of the invention is for recovering a control code from a video signal reproduced by a video disc player.

In the copending U.S. patent application of T. J. Christopher and C. B. Dieterich entitled *"IMPROVED DIGITAL ON VIDEO RECORDING AND PLAYBACK SYSTEM"* Ser. No. 084,465 filed Oct. 12, 1979, it is proposed that digital data be recorded on a video disc during selected lines of the vertical blanking interval and that the data be recovered on playback of the disc for controlling various player functions such as program and playing time identification, locked groove identification and escape, record scanning, etc. PCM is a preferred means of encoding the digital data bacause (unlike Pulse Amplitude Modulation and Pulse Width Modulation) it is essentially a digital technique which facilitates error checking and correction of the recovered data. Non-return-to-zero PCM encoding, as well as synchronous transmission is preferred in order to maximize the data transmission rate within the relatively limited bandwidth available on the video disc.

Christopher and Dieterich propose that the PCM data be represented by the video signal level (e.g., luminance) and be sampled (detected) using the color subcarrier as a source of clock signals. By this means timebase errors which may be present in the luminance signal are also present in the clock signal (derived from chroma burst) and tend to offset each other. To illustrate the principle, if the baud rate of the data tended to vary (due, for example, to warpage or eccentricity of the record) the color burst frequency will vary in the same sense so that, in principle at least, the clock signal will always have a known time relationship with the data signal. This relationship holds true for players designed for variable speed turntables (the constant linear velocity type) and also for players designed for fixed turntable speeds (the constant angular velocity type).

In addition to providing a solution to the clock data synchronization problem mentioned above, Christopher and Dieterich further propose a solution for minimizing a source of data errors caused by shifts in the d.c. level of the video signal. The player they propose utilizes buried subcarrier encoding of the chrominance signal, that is, the chrominance signal recorded on the disc is located or "buried" within the luminance band as taught by Pritchard in U.S. Pat. No. 3,872,498 and is recovered upon playback by means of comb filtering as described in U.S. Pat. No. 3,996,606 (also Pritchard). Christopher and Dieterich propose that the horizontal line adjacent to the line containing data be of constant luminance level. Such an arrangement permits the use of a signal already available in the player, namely the chrominance related output of the comb filter, as the data signal. Since the comb filter subtracts one line from an adjacent line the output is self referenced thereby substantially minimizing the probability of data errors caused by changes in the d.c. level of the video signal.

Detection of PCM data interleaved with analog data is a relatively difficult undertaking in cases where the transmission channel may be subject to noise, gain variations, d.c. level shifts, or other undesired signal pertubations. A PCM detector which is relatively immune to such problems and well suited for recovering data of the standard proposed by Christopher and Dieterich is described in a copending patent application of T. J. Christopher entitled "PCM DETECTOR FOR VIDEO REPRODUCER APPARATUS" Ser. No. 125,640 filed Feb. 28, 1980.

In a representative application of the teachings of Christopher a current source produces an output current proportional to a difference between the instantaneous and average values of a composite signal which includes a serial PCM component interleaved (time division multiplexed) with an analog component. The current is integrated during a central portion of each signaling interval of the PCM component and the integrator is reset to a reference voltage level during initial and terminal portions of the signaling intervals. The process of integrating the signal advantageously enhances the immunity of the detector to PCM signal amplitude variations and resetting the integrator between integration periods where transitions of the signal are likely to occur minimizes the effect of transition edge distortion and increases the probability that the integration will be monotonic which minimizes the detector error rate. An output data signal is then recovered from the integrated signal by means of a threshold device having a threshold voltage level substantially equal to the reference voltage level to which the integrator is reset. This means of deriving an output signal from the integrator has an advantage in that it is readily adaptable for automatically cancelling the effect of drift or manufacturing tolerance variations as explained in detail by Christopher.

The present invention is directed to solving a heretofore unrecognized problem which may occur in certain applications of PCM detectors of the general kind described by Christopher. A first manifestation of the problem relates to an inequality or unbalance in the sensitivity of the detector in which, under certain conditions, the detector may tend to exhibit a higher sensitivity for PCM data of a first signal level and a lower sensitivity for PCM data of a second signal level. This difference in sensitivities, when the signal is accompanied by noise or other pertubations, may result in an occasional failure to detect data present at the second level.

A second manifestation of the problem is that this imbalance in detection sensitivity tends to occur in transmission systems where the average value of the composite signal is different from the average peak-to-peak value of the PCM component signal. Illustratively, this condition may be encountered in video disc players where the data is encoded in a video signal in accordance with the standard proposed by Christopher and Dieterich and the video signal is derived from the subtractive output of a comb filter prior to detection of the PCM component.

In summary, the principles of the present invention are particularly applicable to synchronous PCM detectors of the type comprising a current source for producing an output current proportional to a difference between instantaneous and average values of a composite signal having a PCM component interleaved with an analog component. The detector further comprises an integrator means having a first operating mode for producing an output voltage of predetermined value and a second operating mode for changing the output voltage in proportion to an integral of the current. A control means is utilized for placing the integrator means in the second mode during a central portion of a signaling interval of the PCM component and for placing the integrator means in the first mode during initial and terminal portions of the signaling interval. A threshold device having a threshold voltage level substantially equal to the predetermined value is used for deriving digital data from the output voltage of the integrator means at the end of each of the second operating mode conditions.

The invention is illustrated in the accompanying drawings wherein like reference numbers designate like elements and in which.

Figure 1:
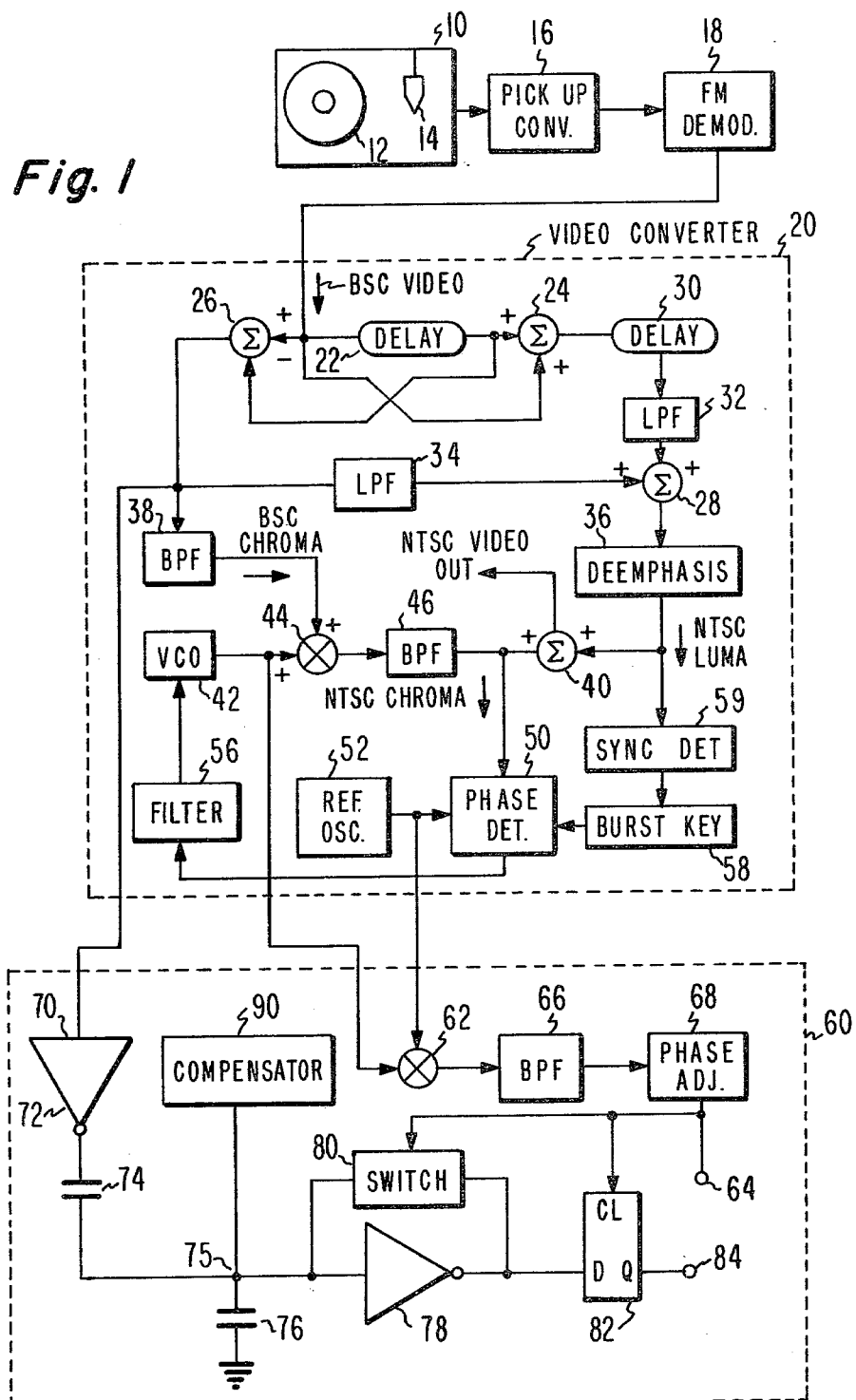
FIG. 1 is a block diagram, partially in schematic form, of a PCM detector embodying the invention interfaced with a video disc player for recovering digital data from a video signal component produced by the player.

The video disc player in FIG. 1 comprises a turntable 10 for rotating video disc 12 and a pickup transducer 14 for recovering information signals from the disc. Illustratively, it will be assumed that the player is intended for use with records in which information is stored in the form of topological variations and recovered by sensing capacitance variations between pickup transducer 14 and the record 12. The output of transducer 14 is coupled to the input of a pickup converter circuit 16 which comprises a capacitance-to-voltage converter responsive to capacitance variations between a stylus in transducer 14 and the record being played for producing an FM output signal voltage representative of the recorded information. Such records and suitable circuits for implementing the capacitance-to-voltage conversion function of pickup circuit 16 are well known. See, for example, U.S. Pat. No. 3,783,196 entitled "HIGH-DENSITY CAPACITIVE INFORMATION RECORDS AND PLAYBACK APPARATUS THEREFOR" which issued to T. O. Stanley, Jan. 1, 1974; U.S. Pat. No. 3,972,064 entitled "APPARATUS AND METHODS FOR PLAYBACK OF COLOR PICTURES/SOUND RECORDS" which issued to E. O. Keizer, July 27, 1976, and U.S. Pat. No. 3,711,641 entitled "VELOCITY ADJUSTING SYSTEM" which issued to R. C. Palmer, Jan. 16, 1973.

Video FM demodulator circuit 18 converts the FM signal produced by pickup circuit 16 to a video output signal. For purposes of illustrating certain features of the invention, it will be assumed that the video signals recorded on the disc are in the previously mentioned "buried subcarrier" (BSC) format rather than the conventional NTSC format. An illustrative subcarrier frequency choice is in the vicinity of 1.53 MHz, with the color subcarrier side bands extending ±500 KHz thereabout and, with the luminance signal band extending well above the highest color subcarrier frequency (to 3 MHz, for example). It will also be assumed that digital data is encoded in the video signal as proposed in the aforementioned Christopher and Dieterich application.

FM demodulator 18 illustratively may be of the pulse counting type or of the phase-lock-loop (PLL) type. A suitable pulse counting type FM demodulator is disclosed in U.S. Pat. No. 4,038,686 entitled "*DEFECT DETECTION AND COMPENSATION*" which issued to A. L. Baker, July 26, 1977. An FM demodulator of the pulse-lock-loop type is described in U.S. patent application, Ser. No. 948,013 of T. J. Christopher, et al. entitled "FM SIGNAL DEMODULATOR WITH DEFECT DETECTION" which was filed Oct. 2, 1978 and now U.S. Pat. No. 4,203,134.

The composite video signal produced by FM demodulator 18 is converted from the BSC format to an NTSC format by video converter 20 (outlined in phantom). The BSC video signal is supplied to the input of delay line 22 and is summed with the output of delay line 22 by means of summation circuit 24 to thereby form a comb filter which separates the luminance component from the composite color video signal. The delay of delay line 22 is selected such that the luminance comb filter has frequency response characteristized by multiple response peaks falling at even integral multiples at half the nominal horizontal line frequency and multiple rejection notches falling at odd integral multiples of half the nominal line frequency. Illustratively, a suitable delay would be equivalent to one horizontal scan interval.

The output of delay line 22 is subtracted from the BSC video signal by subtraction circuit 26 to thereby form another comb filter which passes the chrominance component of the composite video signal. This chrominance comb filter has a frequency response characteristic having multiple peaks falling at odd integral multiples of half the nominal horizontal line frequency and multiple rejection notches falling at even integral multiples of half the normal line frequency.

Delay line 22 may be a conventional LC delay line, an acoustic delay line or preferably may be of a charge couple device (CCD) type. (See for example, the article by J. Matob, entitled "CHARGE COUPLE DEVICE" which appeared in the January 1975 issue of Wireless World). Further advantages and examples of comb filtering and video format conversion may be found in: U.S. Pat. No. 3,872,498 entitled "*COLOR INFORMATION TRANSLATING SYSTEM*" which issued to D. H. Pritchard, Mar. 18, 1975; U.S. Pat. No. 3,996,610 entitled "COMB FILTER APPARATUS FOR VIDEO PLAYBACK SYSTEMS" which issued to H. Kawamoto, Dec. 7, 1976 and the U.S. patent application of T. J. Christopher and L. L. Tretter entitled "VIDEO PROCESSING SYSTEM INCLUDING COMB FILTERS" Ser. No. 966,512 which was filed Dec. 4, 1978 and now U.S. Pat. No. 4,195,309.

Since the frequency range of the luminance signal component in the BSC format is substantially the same as in the NTSC format, all that remains to provide a proper NTSC luminance output signal is to compensate for preemphasis which was performed in the recording process and to supplement the signal with information relating to vertical detail. Supplementation is provided by coupling the output of summation circuit 24 to one input of a further summation circuit 28 via a cascade connection of delay element 30 and a low pass filter 32 and coupling the output of subtraction circuit 26 to the other input of summation circuit 28 via a low pass filter 34. Suitable design parameters for the coupling elements would be: a delay of about 500 nSec. for delay element 30 (this compensates for the delay through low pass filter 34); a passband of 0–5 MHz for low pass filter 32; and a passband of 0–500 KHz for low pass filter 34. Compensation for preemphasis is provided by coupling the output of summation circuit 28 to the input of deemphasis circuit 36 which preferably has a transfer characteristic complementary to that of the preemphasis circuit used in the recording process.

The output of subtraction circuit 26 contains both low frequency luminance information (which is passed by low pass filter 34 for supplementing vertical detail of the luminance signal as previously mentioned) and the chrominance signal in BSC format. The low frequency information is rejected by connecting the output of subtraction circuit 26 to the input of bandpass filter 38 which preferably has a passband of about 1 MHz centered at the BSC frequency of nominally 1.53 MHz.

Since the frequency range of the chrominance signal in the BSC format (nominally 1.53 MHz) is lower than its range in the NTSC format (nominally 3.58 MHz), up-conversion of the output signal of bandpass filter 38 is necessary before the chrominance and luminance signals may be added (in summation circuit 40) to produce an NTSC composite video signal. This frequency translation is provided by voltage controlled oscillator (VCO) 42, multiplier 44 and bandpass filter 46. The output frequency of VCO 42 (when at the center of its control range) is nominally 5.11 MHz. Accordingly, multiplier 44, which mixes or multiplies the BSC chrominance signal produced at the output of bandpass filter 38 with the output of VCO 42, produces output signals of nominally 3.58 and 6.64 MHz. Bandpass filter 46 passes the lower frequency signal (which corresponds to the NTSC chrominance signal standard) to summation circuit 40 where it is summed with the NTSC luminance signal produced at the output of deemphasis circuit 36 to thereby provide a composite video output signal in the NTSC format from the video disc player.

Multiplier 44 and bandpass filter 46 may be of conventional design. It is desirable, however, that VCO 42 feature high stability and be capable of wide frequency deviation. A preferred voltage controlled oscillator having a wide deviation range, is disclosed in the U.S. patent application of T. J. Christopher and J. Wilber entitled "VARIABLE FREQUENCY OSCILLATOR", Ser. No. 51826 which was filed June 25, 1979.

VCO 42, in addition to providing a source of signal for up-conversion of the chrominance signal to NTSC standard, also provides timebase error correction of the converted signal. Timebase errors are detected by means of phase detector 50 which compares the frequency and phase of the color burst component of the chrominance signal produced at the output of bandpass filter 46 with the standard NTSC reference frequency (3.579545 MHz) produced by a reference oscillator 52 and supplies an error voltage to VCO 42 via a filter 56 thereby completing a phase-lock-loop which varies the frequency of VCO 42 in a sense to minimize errors in the up-converted NTSC chrominance signal. Phase detector 50 is keyed during the color burst interval by means of a burst key generator 58 which is triggered by means of a sync detector 59 which detects horizontal synchronizing pulses present in the luminance signal at the output of deemphasis circuit 36.

PCM detector 60 comprises a multiplier 62 which is interfaced with video converter 20 by coupling one input of the multiplier to the output of VCO 42 and the other multiplier input to the output of reference oscillator 52. By this means the same phase-lock-loop which provides timebase correction in video converter 20 serves a dual function as a source of continuous clock signals at the buried subcarrier frequency (1.53 MHz) and these clock signals exhibit timebase errors in proportion to the timebase errors present in the pulse code modulated signal at the output of subtraction circuit 26.

The output signal of multiplier 62 includes sum and difference frequencies of 1.53 MHz and 6.6 MHz. The lower frequency signal is coupled to a clock output terminal 64 by means of a cascade connection of a bandpass filter 66 and a phase adjusting circuit 68. The purpose of circuit 68 is to set the phase of the output clock signal in quadrature with the phase of the buried subcarrier chrominance signal reproduced from the disc. Illustratively, circuit 68 may be an all pass network. Alternatively, the phase shift may be provided by a suitable lead or lag network in combination with a limiter or by means of a suitable delay line.

The signal produced at the output of subtraction circuit 26 is coupled to the input 70 of an inverting amplifier 72 which has an output coupled via a d.c. blocking capacitor 74 to the summing node 75 of a resettable integrator. Capacitor 74, in addition to providing d.c. blocking (which minimizes effects of drift and low frequency noise components) serves a dual purpose in combination with amplifier 72 of acting as a current source for supplying current to node 75 proportional to a difference between the instantaneous and average values of the signal produced at the output of subtraction circuit 26. Preferably, the time constant (i.e., R-C product) formed by the amplifier output impedance and the value of capacitor 74 is very much longer than several PCM data signaling intervals so that the average voltage across capacitor 74 is relatively constant and reflective of the average "vertical detail" signal level. A suitable time constant would be about one millisecond for a PCM signaling rate of about 1.53 Megabaud.

The resettable integrator comprises an integrating capacitor 76 coupled between summing node 75 and a point of reference potential (ground), an inverting amplifier 78 having an input coupled to node 75 and a reset switch 80 connected between the amplifier input and output terminals and controlled by the quadrature clock signal produced at the output of phase adjusting circuit 68. The grounded plate of capacitor 76 may, alternatively, be coupled to the output of amplifier 78 to enhance integration linearity if desired. It is advantageous to connect the capacitor 76 as shown, however, in cases where the output of amplifier 78 is internal node in an integrated circuit. This avoids the need for accessing the internal node and, therefore, may be used to advantage for either reducing the integrated circuit package pin count or for making an extra pin available in a package with a given pin count. Switch 80 may be a conventional bipolar or field effect transistor transmission gate.

The integration time constant of the resettable integrator should be selected to be not less than one half of one signaling interval of the PMC signal to avoid saturation and should be substantially less than the previously mentioned time constant of the differential current source (72, 74). A suitable value (gain considering a 1.53 megabaud data rate) would be on the order of one microsecond which is greater than one but less than two signaling intervals in length. The integration time constant where one plate of capacitor 76 is grounded as shown may be approximated by the product of the output impedance of amplifier 72 and the value of capacitor 76.

The output signal of amplifier 78 is applied to the data input terminal (D) of a D-type flip-flop 82 which has a true output terminal (Q) connected to data output terminal 84. The output signal from phase adjuster 68 is coupled to a clock input terminal (CL) of flip-flop 82 for supplying the quadrature phase clock signal thereto. For purposes of discussion, it will be assumed that flip-flop 82 is of the positive edge triggered type and that switch 80 is of the type which closes in response to positive (high) control signal levels.

Flip-flop 82 performs dual functions of comparing the output of the integrator formed by amplifier 78, capacitor 76 and switch 80 with a threshold voltage and storing the result of the comparison operation. To facilitate this it is preferable that amplifier 78 be of a type which exhibits a quiescent d.c. output voltage when switch 80 is closed which is substantially equal to the logic decision threshold level at the data input of flip-flop 82. Amplifier 78 and flip-flop 82 may be, for example, complementary metal oxide semiconductor (C-MOS) integrated circuits. The threshold voltage of C-MOS circuits is nominally equal to about half the supply voltage but has been found to be subject to some variance from chip to chip. The effect of this variation for devices integrated on a common substrate has been found to be minimal insofar as operation of the present invention is concerned and so it is preferable that amplifier 78 and flip-flop 82 be integrated on the same substrate. The threshold turn-on voltage of switch 80 (e.g., a C-MOS transmission gate) is not critical insofar as detection of the integrator output is concerned and so switch 80 may be on the same integrated circuit as amplifier 78 and flip-flop 82 or externally connected to it.

Detector 60 includes a compensator circuit 90 having an output line connected to node 75 of the integrator for equalizing integrator output voltage excursions relative to the detection threshold level at the data input of flip-flop 82 in cases where the PCM data is encoded in accordance with the standard proposed by Christopher and Dieterich. Compensator 90 comprises a charge source means for supplying a predetermined quantity of charge to node 75 of the integrator (76, 78, 80) each time switch 80 is open. The charge is supplied in a sense to augment the current supplied to node 75 via the current source (amplifier 72 and capacitor 74) when the PCM component of the signal produced at the output of subtraction circuit 26 is at a level closer to an average value of circuit 26 output signal and to oppose the output current of circuit 26 when the PCM signal level is farther from said average value. Suitable circuits for implementing this function are given in FIGS. 3 and 4 and discussed subsequently.

Figure 2:
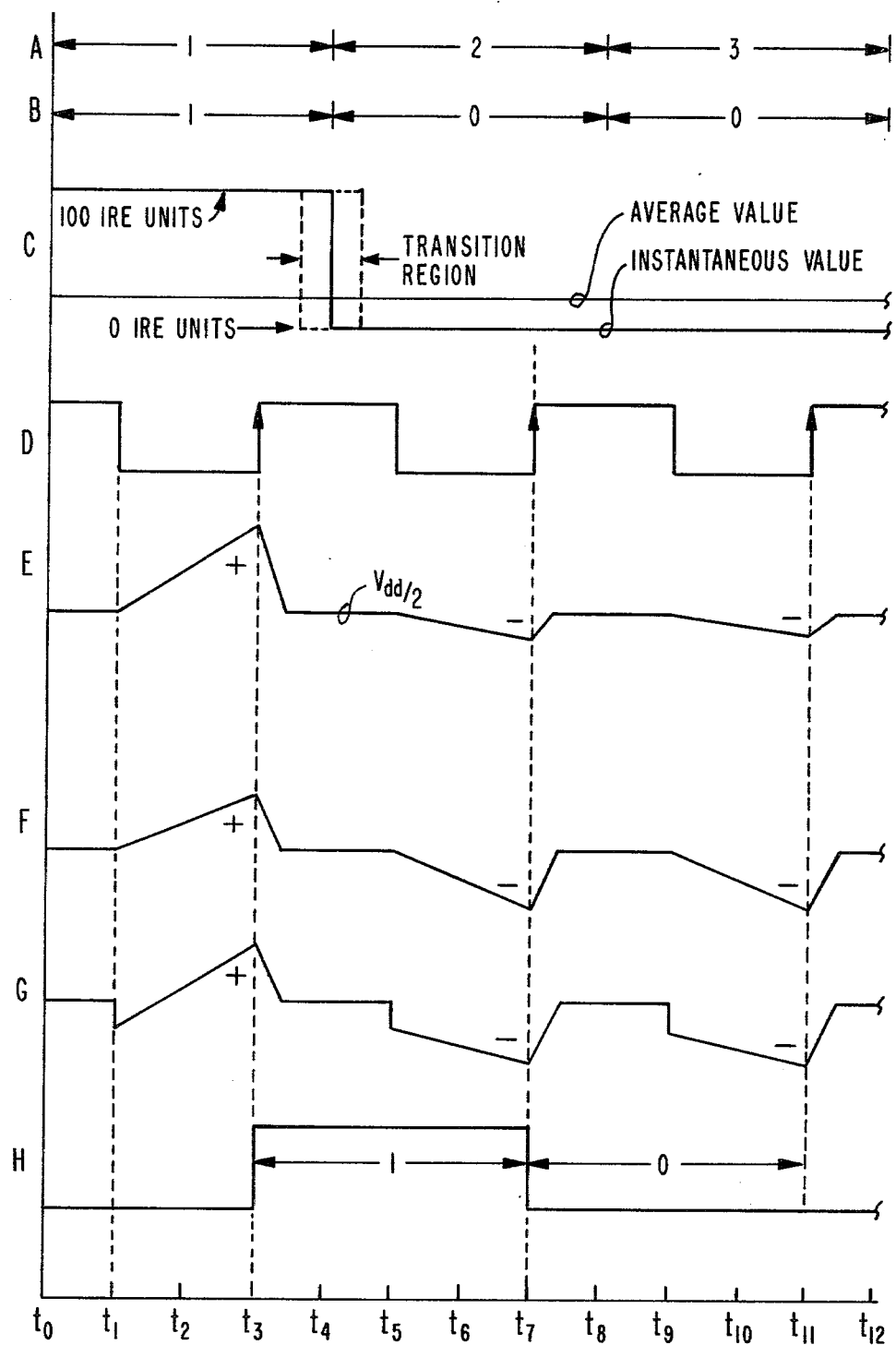
FIG. 2 is a diagram illustrating signal waveforms; and timing relationships of the PCM detector of FIG. 1.

The waveforms of FIG. 2 provide further illustration of the operation of the invention and insight into the subtle nature of the problem solved. It will be assumed in the following discussion that disc 12 is encoded with PCM data in accordance with the previously mentioned standard proposed in the application of Christopher and Dieterich. Three parameters of the standard important to an understanding of operation of the specific example of FIG. 1 are: (1) the PCM data is represented by luminance variations between two levels; (2) each line of data is recorded adjacent to a line of constant luminance; and (3) the line of constant luminance is of a level closer to one of the PCM levels than the other and differs from an average of the luminance signal taken over a number of successive lines. To simplify the discussion it will be assumed that a PCM logic "1" corresponds to a luminance level of 100 IRE units, that a PCM logic "0" corresponds to a luminance level of 0 IRE units, that the line of constant luminance corresponds to a level of 0 IRE units and that the average luminance level taken over a number of successive lines is about 50 IRE units. This average, of course, depends upon picture constant and this will vary, but, an assumed value of 50 units is not unrealistic and serves to illustrate the principles involved.

Upon playback of disc 12 the player pickup transducer 14, pickup circuits 16, FM demodulator 18 and video converter 20 function as previously described for producing an NTSC standard signal at the output of summation circuit 40 as previously described. The digital control signal code occurs during a selected line of the vertical blanking interval and will be assumed to follow the line of constant (blanking level) luminance. The comb filter formed by delay line 22 and subtraction circuit 26 will supply a signal to amplifier 70 whose average level (average taken over a 1 millisecond period) is substantially constant despite any variation in the (1 msec.) average amplitude of the burried subcarrier video signal (which can vary between 0 and 100 IRE units). This results because circuit 26 subtracts each horizontal line from the previous line causing each line's luminance values to be both added and subtracted in the averaging process, causing any variations to cancel. Since the input of amplifier 70 has a substantially constant value (zero IRE units), capacitor 74 will be charged to a voltage level equal to the difference between the average output voltage of amplifier 72 and the average voltage at integration node 75. This latter voltage will have an average (over 1 msec.) value equal to the threshold voltage of amplifier 78 (a CMOS inverter) due to a periodic closure of switch 80 which self biases amplifier 78 to its logic threshold voltage once each half period of the quadrature clock signal and thereby sets the integration node 75 to said logic threshold voltage.

Because the average output voltage of amplifier 72 is constant and the average voltage at integration node 75 is also constant, the charge accumulated on capacitor 74 may be considered to be of constant value so that any instantaneous value of luminance level different from the assumed average will cause amplifier 72 to supply current to or withdraw current from integration node 75 via d.c. blocking capacitor 74. The voltage on capacitor 74, in other words, cannot change instantaneously and therefore, luminance related current which changes at a rate faster than the previously mentioned capacitor 74 amplifier 72 time constant (one millisecond) is coupled to the integration node. Stated another way, capacitor 74 functions in one sense as an integrator for accumulating a charge proportional to the average luminance level (zero IRE units) and in another sense (in combination with amplifier 72) as a differentiator for supplying current to (or withdrawing current from) node 75 depending on whether the instantaneous value of the luminance signal is above or below the average value.

The significance of the charging of capacitor 74 to a voltage level representative of an average luminance level of zero IRE units is, as will now be explained in detail, that the variations of the PCM modulated luminance signal are not symmetrical with respect to zero IRE units and this asymmetry causes amplifier 72 to supply a greater magnitude of current to the integrator for one data logic level than the other. This in turn can cause the integrator output voltage (inverted) at the output of amplifier 78 to be asymmetrical with respect to the logic decision threshold level at the data input terminal of flip-flop 82. Asymmetry at the point when coupled with noise or other signal pertubations, can result in occasional failure of detector 60 to detect one or more code bits. This problem is solved, in accordance with the invention, by means of compensator circuit 90 which supplies a symmetry correcting charge to integration node 75 when switch 80 is opened during the central portion of each data signaling interval.

FIG. 2 illustrates two modes of operation of detector 60, one in which compensator 90 supplies a continuous symmetry correction charge to node 75, the other in which the charge is supplied intermittently. Waveform A signifies three consecutive signaling intervals (1, 2 and 3) of one line of the PCM code for an assumed data message of 1-0-0 (waveform B). Waveform C illustrates the luminance level variation at the output of subtraction circuit 26. Note that since the line containing the message is preceded by a line of blanking level luminance (0 IRE units) the output of subtraction circuit 26 is exactly equal to its input and varies between 100 IRE units for a data logic "1" (signaling interval 1) and 0 IRE units for a data logic "0" (signaling intervals 2 and 3). Note also that the average value of luminance taken over the previous several lines is at or close to 0 IRE units as previously explained. As a result of this difference between instantaneous and average values of luminance at the subtractive output of the comb filter (22, 26) a greater current is withdrawn from integrator node 75 for a PCM logic "1" state than is supplied to node 75 for a logic "0" state (ignoring, for the moment, compensator 90).

Waveform D illustrates the quadrature clock signal produced at the output of phase adjuster 68 which is 90 degrees out of phase with the PCM signaling intervals (waveform A). During the initial portion ($t_0$–$t_1$) and the terminal portion ($t_3$–$t_4$) of the first signaling interval, waveform D is high whereby switch 80 is closed. This completes a negative feedback path around amplifier 78 which self biases the amplifier (C-MOS as assumed) at a level of nominally half its supply voltage and resets the integrator. During the central portion ($t_1$–$t_3$) of the first signaling interval, when the clock signal is low, switch 80 is opened so that the integrator is enabled and capacitor 76 is charged in a negative sense by current supplied to node 75 from amplifier 72.

Waveform E illustrates a component of the node 75 voltage due solely to the luminance related current. As shown, the negative peak value of this voltage during the first signaling interval for a logic "1" data state is substantially greater than the positive peak values occurring during signaling intervals 2 and 3 when the PCM data is at logic "0". This results because during the first signaling interval the instantaneous value of the luminance signal is nearly 100 IRE units above the average value whereas during intervals 2 and 3 it is nearly equal to the average value. For purposes of discussion, positive peaks are illustrated as being slightly greater than the average value, if they equaled the average value the integral would be zero and the data would not be detected. As a practical matter, of course, some data would always be detected due to shifts in the average luminance level which depends upon picture content.

Waveforms F and G illustrate the node 75 voltage for two modes of operation of symmetry compensator 90. In waveform F compensator 90 continuously supplies charge to node 75 in a sense to oppose the current produced by amplifier 72 when the PCM data is at logic "1" and to aid the current produced by amplifier 72 when the PCM data is at logic "0". Waveform G is similar to F except that rather than the charge being continuously supplied (e.g., via a constant current source) it is supplied intermittently in discrete amounts (e.g., via a charge pump) at the beginning of each integration period. It could, alternatively be supplied at any time within the integration period prior to a positive transition of waveform D where the integrator output is sampled and stored by means of flip-flop 82.

Waveform H illustrates the detector output signal at terminal 84. Each time waveform D makes a positive transition ($t_3$, $t_7$, $t_{11}$) switch 80 closes thereby resetting the integrator and simultaneously clocking flip-flop 82. Since the integrator node 75 is negative at time $t_3$ the amplifier 78 output will be high relative to the threshold of flip-flop 80 so the flip-flop will be set and produce a logic "1" at its true output (Q) which corresponds to the value of the data during signaling interval 1. Operation is similar during intervals 2 and 3 except that the PCM data is at logic zero and the flip-flop is reset and produces a logic zero at its output. Since the flip-flop is only responsive to positive clock transitions (assumed) the stored data will remain at the flip-flop output for a time equal to one signaling interval in length and will be delayed by a time equal to three quarters of a signaling interval (waveform H).

As illustrated in waveforms F and G integration of the luminance signal takes place only during the central portion of each signaling interval. This is where transitions of the signal are least likely to occur (indicated by dashed lines in waveform C) and where the signal to noise ratio is maximal. The integrator is effectively disabled during the initial and terminal portions of each of the signaling intervals where transitions are most likely to occur and so distortion of the signal during those times is effectively rejected.

Figure 3:
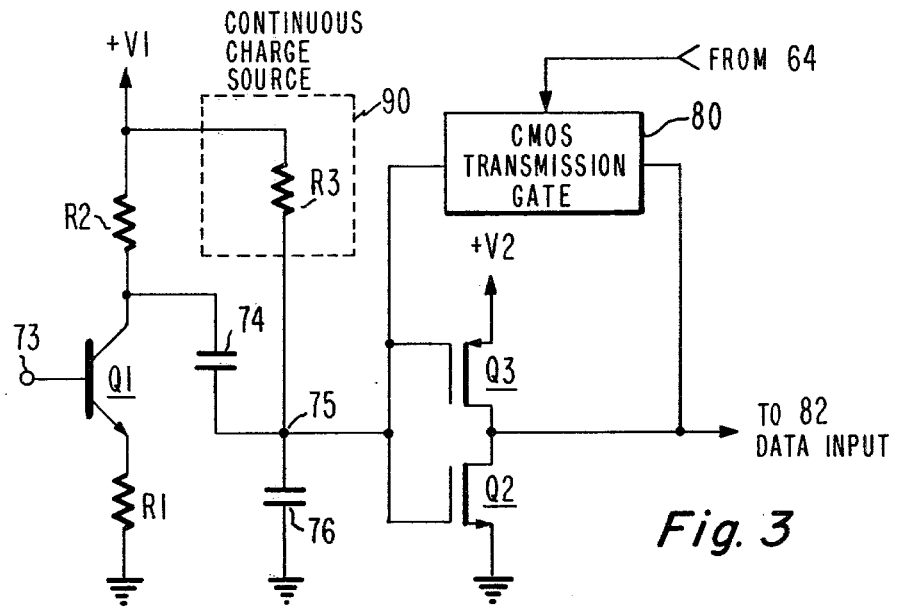
FIG. 3 is a schematic diagram, partially in block form, of a portion of the detector of FIG. 1 illustrating a preferred form of continuous charge compensation.

In FIG. 3 amplifier 72 is implemented by means of an NPN transitor Q1 operated in common emitter configuration. The ratio of the collector load resistor R2 and the emitter degeneration resistor R1 determines the amplifier gain. The collector load resistor also determines the amplifier output impedance which should be selected with regard to the values of d.c. blocking capacitor 74 and integration capacitor 76 to provide the aforementioned two widely spaced time constants. Amplifier 78 comprises N channel (Q2) and P channel (Q3) field effect transitors arranged as a CMOS inverter. Switch 80 is a CMOS transmission gate connected between the gate and drain electrodes of transistors Q2 and Q3. Compensator 90 comprises a resistor R3 which in this case is connected between a supply voltage source +V1 which is more positive than one half of the supply voltage +V2 of the CMOS inverter, so as to continuously supply current to node 75. In operation, a PCM logic "1" level causes the collector voltage of Q1 to decrease substantially whereas a logic "0" causes little change. The charge added to capacitor 76 via resistor R3 when gate 80 is open equalizes the node 75 voltage changes for the different logic states as shown in waveform F of FIG. 2. The value of R3 should be chosen such that a voltage differential of +V1 minus the logic threshold voltage of inverter 78 will produce a current flow through R3 substantially equal to half the current flow through capacitor 74 when an input signal equal to 100 IRE units greater than average is present at the input of amplifier 72.

Figure 4:
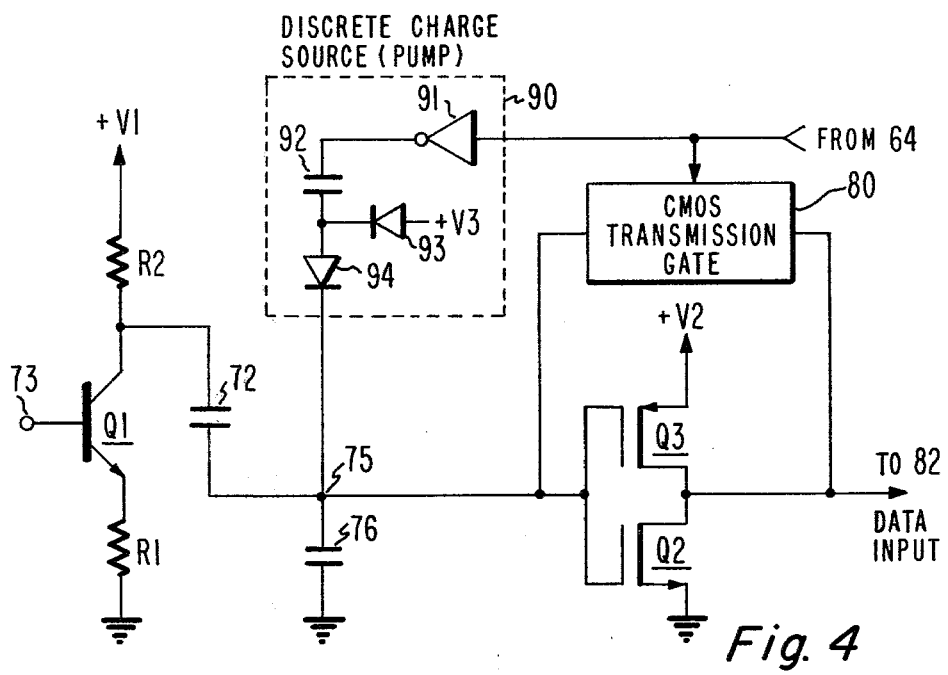
FIG. 4 is a schematic diagram, partially in block form, of a portion of the detector of FIG. 1 illustrating a form of discrete charge compensation.

FIG. 4 is similar to FIG. 3 except that compensator 90 is implemented by means of a discrete charge source (pump) rather than a continuous current source. The charge pump comprises an inverter 91 responsive to the quadrature clock signal for causing capacitor 92 to accumulate charge via diode 93 from supply V3 during the initial or terminal portions of each signaling interval. Inverter 91 then causes capacitor 92 to discharge into capacitor 76 via diode 94 during the central portion of each signaling interval (waveform G, time $t_1$, $t_5$, $t_9$). The quantity and sense of the charge transfer should be selected as previously explained to equalize the peak-to-peak values of the integral of the PCM signal relative to the threshold of flip-flop 82.

What is claimed is:

1. In a synchronous detector for recovering digital data from a composite signal comprising a PCM component interleaved with an analog component, said detector comprising:

a current source for producing an output current proportional to a difference between instantaneous and average values of said composite signal;

integrator means having a first operating mode for producing an output voltage of predetermined value and a second operating mode for changing said ouput voltage in proportion to an integral of said current;

control means for placing said integrator means in said second mode during a central portion of a signaling interval of said PCM component and for placing said integrator means in said first mode during initial and terminal portions of said signaling interval;

a threshold device having a threshold voltage level substantially equal to said predetermined value for deriving said digital data from the output voltage of said integrator means at the end of said first operating mode;

and wherein said PCM component exhibits a first data level substantially equal to said average value of said composite signal and a second data level substantially different from said average value whereby peak-to-peak excursions of said output voltage of said integrator means tend to be asymmetrical with respect to said predetermined value of output voltage, and tend to cause said threshold device to exhibit a greater probability of detection of one state of said digital data than of another state, the improvement for equalizing said output voltage excursions so as to provide a substantially equal probability of detection of said data states by said threshold device, comprising:

charge source means for supplying a charge to said integrator each time said integrator is in said second operating mode, said charge being supplied in a sense to augment the output current produced by said current source when said PCM component is at said first data level, and to oppose the output current produced by said current source when said PCM component is at said second data level.

2. A detector as recited in claim 1 wherein said charge source means comprises resistive means connected between a point of fixed reference voltage and a summing node in said integrator means to which an output of said current source is coupled, said resistive means continuously supplying current to said node in both operating modes of said integrator means.

3. A detector as recited in claim 1 wherein said charge source means comprises charge pump means for accumulating a predetermined charge when said integrator means is in said first operating mode for supplying the accumulated predetermined charge to a summing node in said integrator means to which an output of said current source is connected when said integrator means is in said second operating mode.

4. In a synchronous detector for recovering a digital control code represented by pulse code modulated luminance variations of a video signal occurring during selected lines of a vertical blanking interval, each line of code being adjacent to a line of constant luminance level, said detector comprising:

current source means for producing an output current proportional to a difference between instantaneous and average values of said video signal;

quadrature clock means for producing a clock signal in phase quadrature with signaling intervals of said code;

resettable integrator means responsive to a first level of said clock signal for integrating said current and producing an output voltage representative of the integral thereof and responsive to a second level of said clock signal for resetting and changing said output voltage to a reference level;

memory means having an input threshold level substantially equal to said reference level and responsive to the output voltage of said integrator means and to said clock signal for assuming a first logic state upon a transition of said clock signal of a given sense when said output voltage is greater than said threshold level and for assuming a second logic state upon said transition of said given sense when said output voltage is less than said threshold level; and wherein one luminance level of said code is substantially equal to said average value of said video signal and another luminance level of said code is substantially different from said average value whereby peak-to-peak excursions of the output voltage of said integrator means tend to be asymmetrical with respect to said threshold level of said memory means resulting in an unequal probability of detection of said luminance levels, the improvement for equalizing said peak-to-peak excursions of said integrator output voltage with respect to the threshold level of said memory means, comprising:

charge source means for supplying a charge to said integrator means when said clock signal is at said first level, said charge being supplied in a sense to augment the output current produced by said current source means for said one luminance level of said code.

5. A detector as recited in claim 4 wherein said charge source means comprises resistive means connected between a point of fixed reference voltage and a summing node in said integrator means to which an output of said current source means is coupled, said resistive means continuously supplying current to said node.

6. A detector as recited in claim 4 wherein said charge source means comprises charge pump means responsive to said second level of said clock signal for accumulating a predetermined charge and responsive to said first level of said clock signal for supplying the accumulated predetermined charge to a summing node in said integrator means to which an output of said current source means is connected.

* * * * *